(12) United States Patent
Zhu et al.

(10) Patent No.: US 7,987,368 B2
(45) Date of Patent: Jul. 26, 2011

(54) PEER-TO-PEER NETWORKS WITH PROTECTIONS

(75) Inventors: Bin Zhu, Edina, MN (US); Xiaoming Wang, Guangzhou (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1012 days.

(21) Appl. No.: 11/381,951

(22) Filed: May 5, 2006

(65) Prior Publication Data

US 2007/0113096 A1 May 17, 2007

Related U.S. Application Data

(60) Provisional application No. 60/731,204, filed on Oct. 28, 2005.

(51) Int. Cl.
*H04L 9/32* (2006.01)
(52) U.S. Cl. ......... 713/175; 713/156; 713/173; 713/176
(58) Field of Classification Search .................. 713/175, 713/156, 173, 176
See application file for complete search history.

(56) References Cited

U.S. PATENT DOCUMENTS

| 7,458,082 | B1 * | 11/2008 | Slaughter et al. ............. 719/328 |
|---|---|---|---|
| 2001/0034846 | A1 | 10/2001 | Beery |
| 2002/0035723 | A1 | 3/2002 | Inoue et al. |
| 2002/0147771 | A1 * | 10/2002 | Traversat et al. ............. 709/203 |
| 2003/0009688 | A1 | 1/2003 | Schmidt et al. |
| 2003/0018798 | A1 | 1/2003 | Lee et al. |
| 2003/0055898 | A1 * | 3/2003 | Yeager et al. ................. 709/205 |
| 2003/0078888 | A1 | 4/2003 | Lee et al. |
| 2003/0105831 | A1 | 6/2003 | O'Kane |
| 2003/0163697 | A1 * | 8/2003 | Pabla et al. ................... 713/171 |
| 2003/0217139 | A1 | 11/2003 | Burbeck et al. |
| 2004/0054885 | A1 * | 3/2004 | Bartram et al. ............... 713/152 |
| 2004/0100953 | A1 | 5/2004 | Chen et al. ..................... 370/389 |
| 2004/0243580 | A1 * | 12/2004 | Markki et al. ..................... 707/9 |
| 2005/0039045 | A1 | 2/2005 | Wheeler |
| 2007/0079362 | A1 * | 4/2007 | Lortz et al. ........................ 726/5 |

FOREIGN PATENT DOCUMENTS

GB 2369203 5/2002

OTHER PUBLICATIONS

Iwata, et al., "A DRM System Suitable for P2P content Delivery and the Study on its Implementation", vol. 2, Sep. 21-24, 2003, pp. 806-811.
Kalker, et al., "Music2Share-Copyright-Compilant Music Sharing in P2P Systems", IEEE, vol. 92, No. 6, Jun. 2004, pp. 961-970.
Nutzel, et al., "Potato System and Signed Media Format—an Alternative Approach to Online Music Business", Sep. 2003, pp. 23-26.
PCT International Search Report and Written Opinion for Application No. PCT/US2006/042046 mailed on Mar. 13, 2007, p. 1-10.
Translated Chinese Office Action mailed Feb. 25, 2011 for Chinese Patent Application No. 200680039838.5, a counterpart foreign application of U.S. Appl. No. 11/381,951.

* cited by examiner

*Primary Examiner* — Edan Orgad
*Assistant Examiner* — Bradley Holder
(74) *Attorney, Agent, or Firm* — Lee & Hayes, PLLC

(57) ABSTRACT

In a peer-to-peer environment, copyrights and users' privacies can be protected by a tracking mechanism. In described implementations, tracking mechanisms can use certificates that are produced using random numbers to protect the privacy of users and/or certificates that are produced responsive to at least one hardware identifier to enable uploader to be identified to protect copyrights.

16 Claims, 6 Drawing Sheets

VERIFYING AUTHENTICITY & INTEGRITY MECHANISM

US 7,987,368 B2

PEER-TO-PEER NETWORKS WITH PROTECTIONS

CROSS-REFERENCE TO RELATED APPLICATION(S)

This Nonprovisional Patent Application claims the benefit of U.S. Provisional Patent Application No. 60/731,204, filed Oct. 28, 2005. The Provisional Patent Application No. 60/731,204 is hereby incorporated by reference in its entirety herein.

BACKGROUND

The internet can be used to share, transmit, distribute, or otherwise transfer information in accordance with many different communication paradigms. One example communication paradigm is the client-server paradigm. With the client-server paradigm, a server typically stores most of the information. Multiple clients communicate with the server to transfer information to and from the server. There is relatively little direct client-to-client communication.

Another example communication paradigm is the peer-to-peer (P2P) paradigm. With the P2P paradigm, peers typically store most of the information. Each peer is usually capable of communicating with multiple other peers to facilitate the transfer of information between and among the multiple peers. In an example approach to constructing P2P networks, a P2P network can be "overlaid" on top of the internet or another physical network. As compared to the transfer of information between a server and the clients thereof it is often more difficult to monitor and regulate the transfer of information within a P2P network.

SUMMARY

In a peer-to-peer environment, copyrights and users' privacies can be protected by a tracking mechanism. In described implementations, tracking mechanisms can use certificates that are produced using random numbers to protect the privacy of users and/or certificates that are produced responsive to at least one hardware identifier to enable an uploader to be identified to protect copyrights.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction

Figure 1:
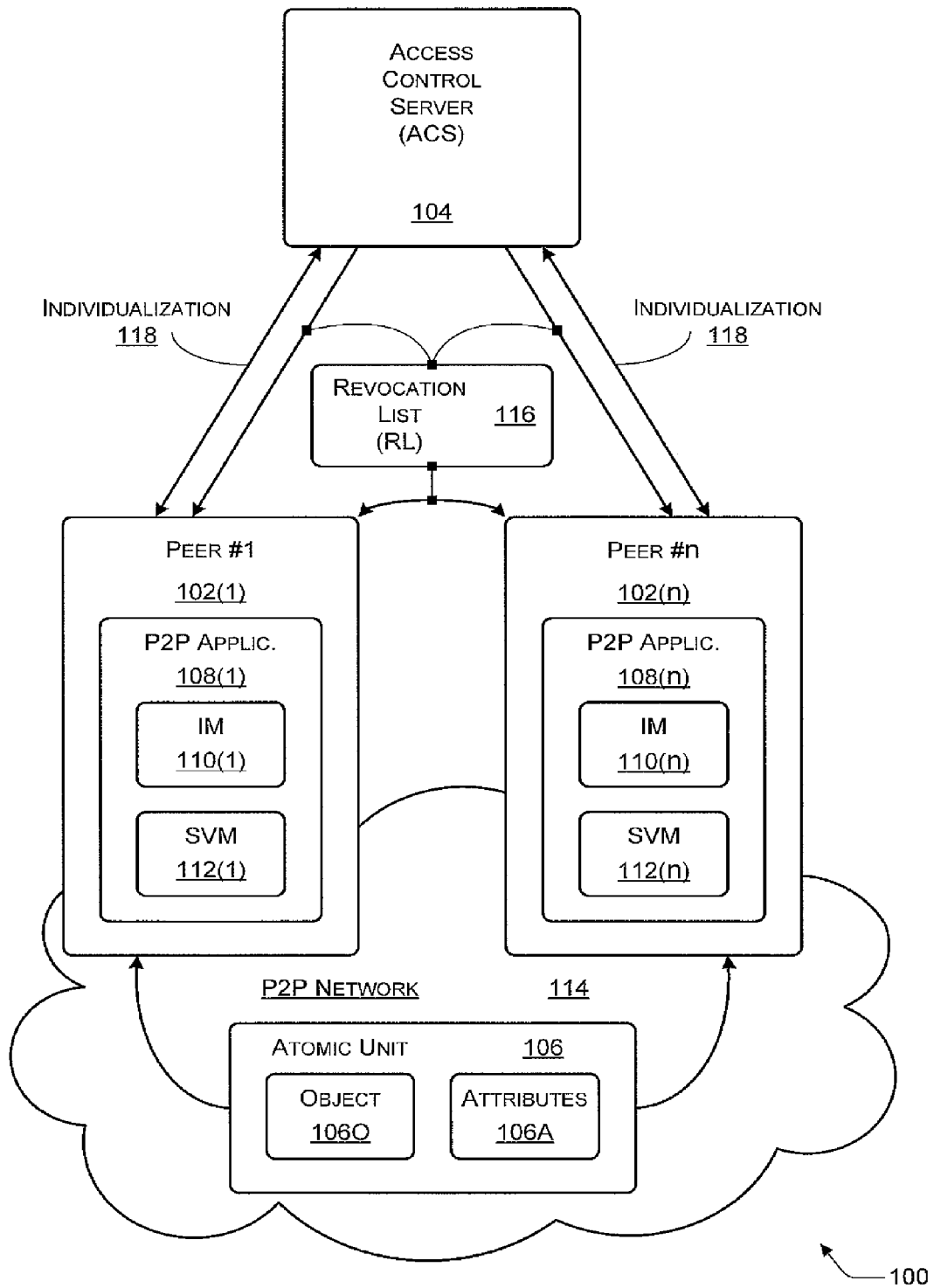
FIG. 1 is a block diagram illustrating an example peer-to-peer (P2P) network architecture in which protections may be instituted.

It is possible that peer-to-peer (P2P) networks need to have built-in copyright protection if P2P technologies are to advance independently of interference from courts and legislatures. An example P2P network that is described herein includes relatively strong privacy protection as well as a secure and reliable tracking mechanism for copyright protection. The tracking mechanism can track the original uploader of any materials uploaded to, replicated by, and/or transferred in the P2P network.

Although the privacy of uploaders is generally protected, when a pirated or otherwise illicit material is discovered, its uploader can be tracked down. Moreover, the uploader's access to the P2P network can be permanently revoked, and the materials uploaded by the uploader can be removed. The whole protection system is decentralized and may be completely transparent to end users. One embodiment is referred to as a privacy- and copyright-protected peer-to-peer network (PCPN). It involves a hardware-bound tracking mechanism that employs widely used cryptographic primitives and technologies that are proven and robust.

Thus, in a described implementation, the protection system is an a posteriori system. In other words, instead of blocking the uploading of protected copyrighted works a priori, a described implementation of the protection system enables uploaders to be positively identified after they have uploaded a protected copyrighted work. It is believed that the tracking and/or access blocking effectively deters users from illegally uploading any copyrighted materials to the P2P network and dramatically reduces the amount of copyrighted materials that are shared through the P2P network. However, described implementations for PCPN can incorporate any a priori protection technologies, such as global or individualized watermarking, digital rights management (DRM), persistent access control, etc. to make the system even better in fighting against piracy.

In an example described implementation for PCPN, each digital asset that is uploaded to PCPN is joined to persistent metadata, which contains an uploader-signed certificate that is used to track the original uploader. Authenticity and validity of the certificate and the associated material are verified when a digital material is first uploaded to PCPN or subsequently replicated from one peer to another. A design principle for PCPN is the assumption that an uploader is liable for whatever he or she uploads to PCPN.

Each PCPN end user is entitled to publish anything in PCPN and to remain anonymous until a pirated, malicious, or otherwise illicit material is discovered. After discovery of an illicit material, the tracking mechanism is invoked to track down the original uploader of the material. Once "convicted" of uploading illicit material, all the materials uploaded by the convicted uploader are removed from PCPN. Additionally, the uploader may be punished in any of several possible manners, which can range from (i) a permanent revocation of access to PCN and/or of a publishing privilege within PCPN to (ii) civil and/or legal actions against the user/uploader. A revocation list is used to ban convicted peers from access to or publishing in PCPN.

Within PCPN, a copy of digital material is termed an object. The metadata that is associated with an object and that provides auxiliary information and/or specifies behaviors are called the attributes of the object. For example, the certificate used for tracking an uploader is a tracking attribute. In PCPN, an object and its tracking attribute are treated as an atomic unit when uploaded to PCPN or transferred from one peer to another.

Example Environments, Technology, and Devices for P2P Networks with Protections

FIG. 1 is a block diagram illustrating an example peer-to-peer (P2P) network architecture 100 in which protections may be instituted. As illustrated, P2P network architecture 100 includes a P2P network 114, multiple peers 102, an access control server (ACS) 104, a revocation list (RL) 116, and an atomic unit 106. Each peer 102 includes a P2P application 108. Each P2P application 108 includes an individualization module (IM) 110 and a signing and verifying module (SVM) 112. Each atomic unit 106 includes an object 106O part and an attributes 106A part.

Specifically, peer #1 102(1) ... peer #n 102(n) are shown, with "n" being any integer. The multiple peers 102 communicate over P2P network 114. P2P network 114 may be a standalone network. It may also be overlaid on top of one or more other networks, such as an internet, a telephone/cellular network, a wired or wireless network, some combination thereof, and so forth. Peers 102 are empowered to transfer atomic units 106 between and among each other in accordance with at least one associated attribute 106A.

Each atomic unit 106 includes one or more objects 106O. An object 106O is the information that a user wishes to communicate. Objects 106O include, but are not limited to, multimedia content, a software module or program, a file, an image, some combination thereof, and so forth. Associated attributes 106A are metadata that pertain to object 106O. The metadata may describe object 106O, stipulate rights for and/or uses of object 106O, provide tracking data for object 106O, some combination thereof, and so forth.

In a described implementation, ACS 104 issues individualized ACS-signed certificates during individualization schemes 118. More generally, certificates can be issued by a (e.g., trusted) certification authority. ACS 104 also creates, maintains, and disseminates revocation list 116. Revocation list 116 indicates which peers 102 are permitted to upload atomic units 106 to P2P network 114 and which peers are permitted to otherwise access P2P network 114. Revocation list 116 can be transmitted from ACS 104 to peers 102 and/or between any two peers 102.

To participate in P2P network 114, each peer 102 installs a P2P application 108. P2P application 102 is capable of performing "standard" P2P functionality. Standard P2P functionality includes, but is not limited to, creating directories of stored information, enabling stored information to be found (e.g., through indexes, searches, catalogs, etc.), facilitating transfers of the stored information, and so forth.

P2P application 108 also includes IM 110 and SVM 112. IM 110 and SVM 112 are tamper-resistant (if not tamper-proof) security modules. They can jointly enforce copyright protection and access control. They function like a black box to users, to other P2P modules of P2P application 108, and to other applications of a peer 102.

Generally, IM 110 individualizes each SVM 112 in conjunction with a trustworthy ACS 104. SVM 112 checks revocation list 116 and verifies the authenticity and integrity of an object 106O and its tracking attribute 106A before permitting the peer 102 to upload an object to P2P network 114, to download an object from P2P network 114, or to replicate an object. Any objects that fail this verification may be removed from P2P network 114.

More specifically, for peer #1 102(1), for example, IM 110(1) interacts with ACS 104 during individualization scheme 118 to individualize P2P application 108(1) for use on peer #1 102(1). When a user of peer #1 102(1) wishes to upload object 106O to P2P network 114, SVM 112(1) creates attributes 106A and bundles object 106O and attributes 106A into atomic unit 106. When a user of peer #n 102(n) wishes to access object 106O, P2P application 108(1) transfers atomic unit 106 to P2P application 102(n) of peer #n 102(n) via P2P network 114. SVM 112(n) verifies the authenticity and integrity of object 106O using attributes 106A before permitting the user of peer #n 102(n) access to object 106O.

In a described implementation, revocation list 116 contains a list of revoked certificates previously issued by an ACS 104. Revocation list 116 is distributed to peers 102 and/or made available at a central server (e.g., ACS 104). A peer 102 can cache revocation list 116 in local storage for later usage so it does not have to download revocation list 116 every time its SVM 112 needs to check revoked certificates.

When a peer 102 enters P2P network 114, it optionally checks and updates the local revocation list 116 from another peer 102 or from the central server. If a threshold of a maximum non-updating period has been reached, a peer 102 is forced to update its locally stored revocation list 116. Any objects signed by a revoked certificate are removed from P2P network 114. Consequently, a user whose ACS-issued certificate is listed in revocation list 116 cannot upload anything to P2P network 114.

Depending on the policy set up for a given P2P network 114, each SVM 112 at a peer 102 may also check revocation list 116 to check if the peer is allowed to access P2P network 114. If the peer's certificate is in revocation list 116, the peer's SVM 112 refuses to verify any incoming objects for the peer. Consequently, the peer 102 cannot download anything from P2P network 114. SVM 112 also informs other modules of the peer's P2P application 108 to refuse any service requests by the peer. The peer's access to P2P network 114 is therefore effectively denied.

In a described implementation, P2P network architecture 100 utilizes two different certificates: an ACS-signed certificate and a peer-signed certificate. The former certifies that a particular peer is permitted access to P2P network 114. The latter certifies that the particular peer did indeed upload a given object 106O to P2P network 114. These two certificates are described further herein below with particular reference to FIG. 2 and the flow diagrams of FIGS. 4-6.

With individualization scheme 118, a given peer 102 is granted an ACS-signed certificate. Thereafter, the given peer 102 need not contact ACS 104 prior to uploading/downloading atomic units 106 to/from P2P network 114. Nevertheless, the origin of an atomic unit 106 can be traced when desired. Moreover, the identity of each originating peer 102 may be kept secret from other peers 102. This secrecy is enabled, at least in part, by the use of two random numbers in the creation of attributes 106A.

Figure 2:
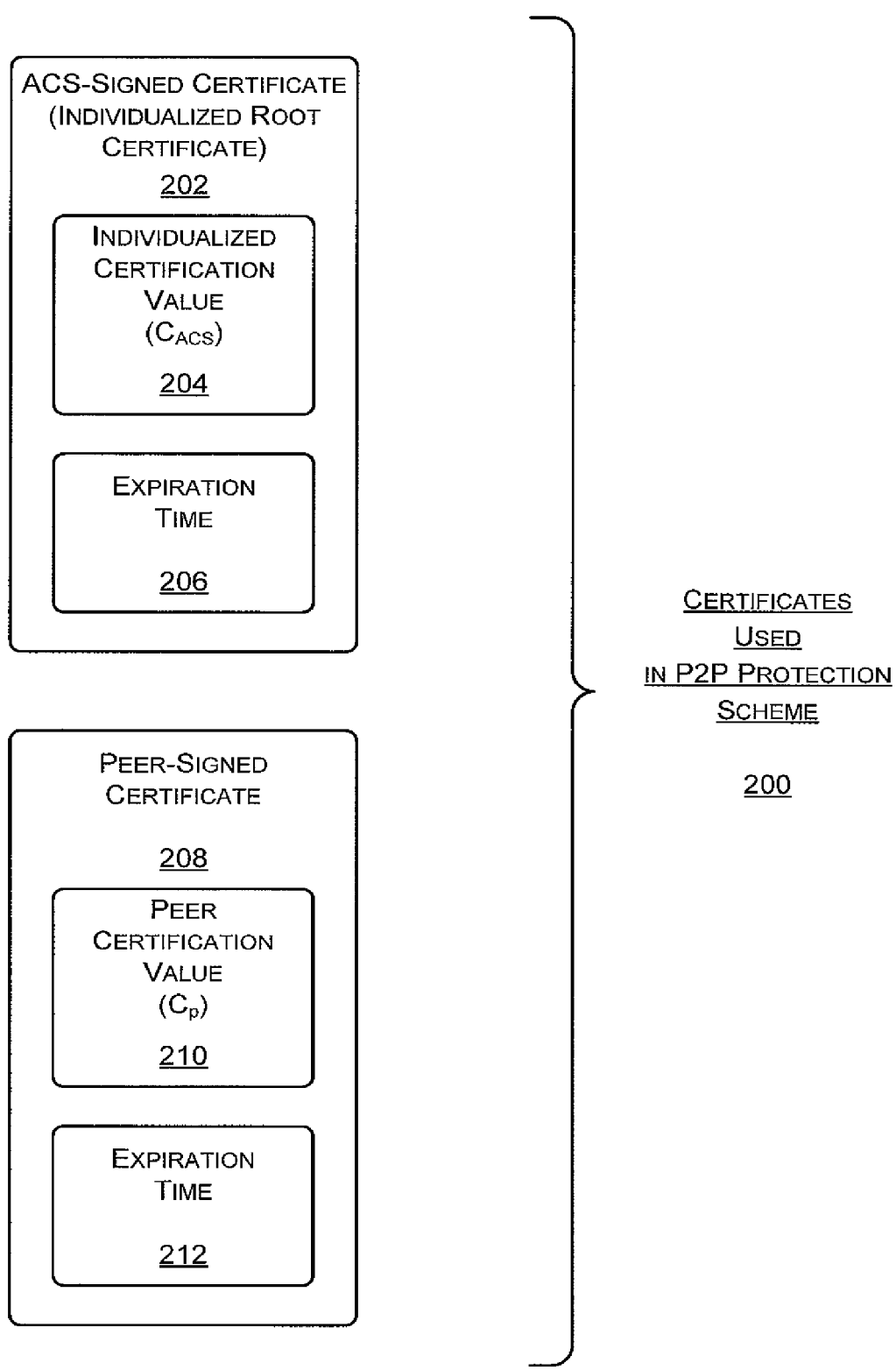
FIG. 2 is a block diagram of two example certificates that may be used in a P2P network with protections.

FIG. 2 is a block diagram 200 of two example certificates that may be used in a P2P network with protections. Block diagram 200 includes an ACS-signed certificate 202 and a peer-signed certificate 208. As illustrated, each includes a certification value and an expiration time. The expiration times can be a date certain or an elapsed period at which the associated certificate becomes invalid.

In a described implementation, ACS-signed certificate 202 serves as an individualized root certificate. ACS-signed certificate 202 includes an individualized certification value ($C_{ACS}$) 204 and an expiration time 206. In operation, the trustworthy ACS 104 (of FIG. 1) individualizes SVM 112 at each peer 102 during installation of P2P application 108 by issuing a (root) certificate 202 that binds the peer's public key ($K_p$) to the hardware of the peer.

Peer-signed certificate 208 includes a peer certification value ($C_p$) 210 and an expiration time 212. In operation, the SVM 112 at a peer 102 generates a peer-signed certificate 208 that is attached as the tracking attribute 106A to each object 106O that the peer uploads to P2P network 114. The production of individualized certification value ($C_{ACS}$) 204 and peer certification value ($C_p$) 210, as well as the formulation of ACS-signed certificate 202 and peer-signed certificate 208, are described further herein below with particular reference to FIGS. 4-6.

Figure 3:
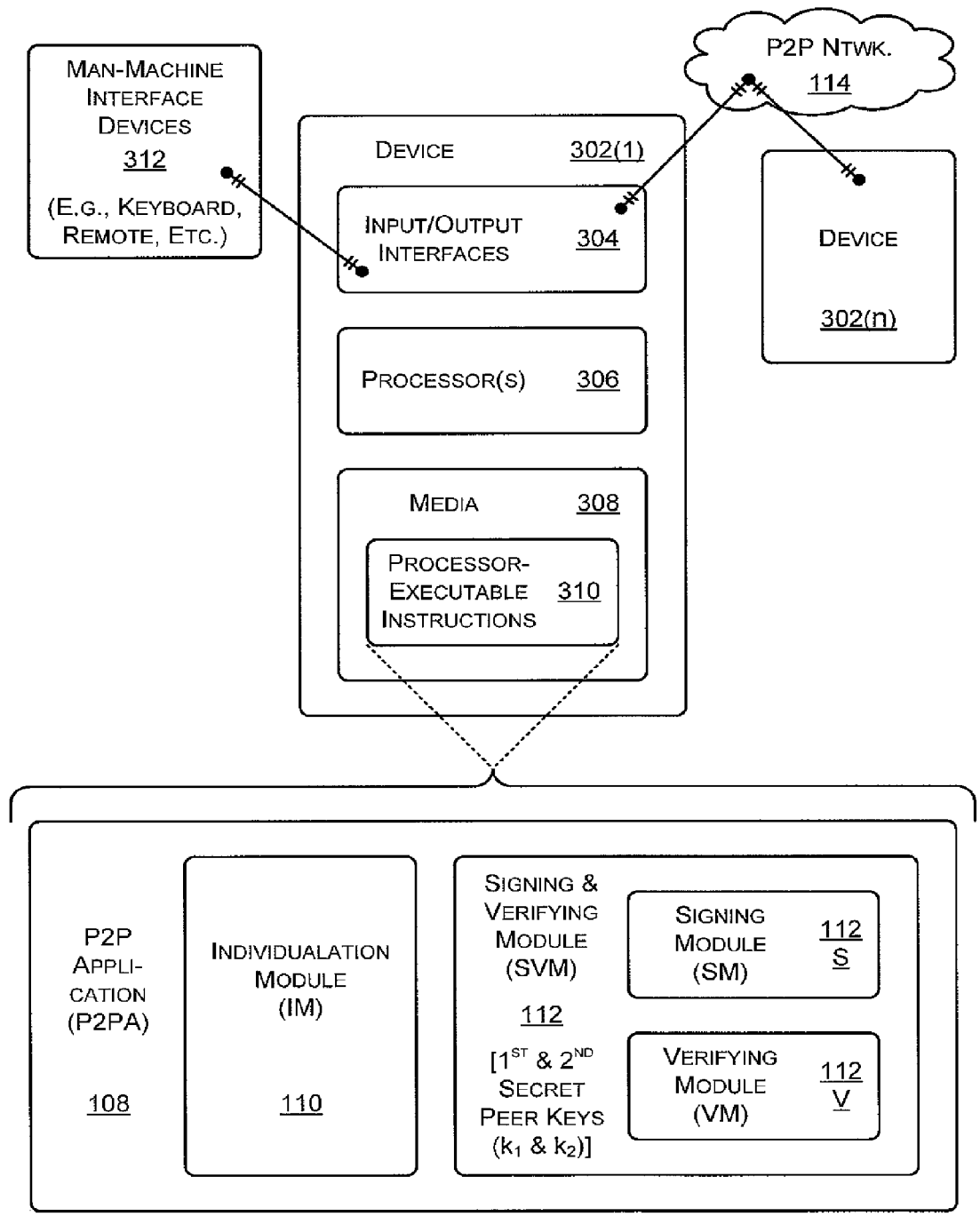
FIG. 3 is a block diagram of an example device that may be operated in a P2P network with protections in which the example device includes a P2P application having an individualization module (IM) and a signing and verifying module (SVM).

FIG. 3 is a block diagram of an example device 302 that may be operated in P2P network 114. Device 302 includes P2P application 108, which has IM 110 and SVM 112. In a described implementation, each device 302(1 ... n) corresponds to a respective peer 102(1 ... n) (of FIG. 1).

Multiple devices 302 are capable of communicating across one or more P2P networks 114. As illustrated, two devices 302(1) and 302(n) are capable of engaging in communication exchanges via P2P network 114. Although two devices 302 are specifically shown, one or more than two devices 302 may be employed, depending on implementation.

In one example implementation, one device 302 (e.g., device 302(1)) is being used to upload an object to P2P network 114. P2P network 114 may be layered on top of one or more other networks, such as the Internet, an intranet, a telephone network, a cable network, a wireless or wired network, some combination thereof, and so forth.

Generally, device 302 may represent any computer or processing-cable device, such as a server device; a workstation or other general computer device; a personal digital assistant (PDA); a mobile phone; a gaming platform; an entertainment device; some combination thereof; and so forth. As illustrated, device 302 includes one or more input/output (I/O) interfaces 304, at least one processor 306, and one or more media 308. Media 308 include processor-executable instructions 310.

Although not specifically illustrated, device 302 may also include other components in addition to I/O interfaces 304, processors 306, and media 308. Each hardware component may include a component hardware ID, which is used to ascertain a peer hardware ID ($PHID_p$). Ascertaining a peer hardware ID ($PHID_p$) is described herein below with particular reference to FIG. 4.

In a described implementation of device 302, I/O interfaces 304 may include (i) a network interface for communicating across the physical layer of P2P network 114, (ii) a display device interface for displaying information on a display screen, (iii) one or more man-machine interfaces, and so forth. Examples of (i) network interfaces include a network card, a modem, one or more ports, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 312 (e.g., a keyboard, a mouse or other graphical pointing device, etc.).

Generally, processor 306 is capable of executing, performing, and/or otherwise effectuating processor-executable instructions, such as processor-executable instructions 310. Media 308 is comprised of one or more processor-accessible media. In other words, media 308 may include processor-executable instructions 310 that are executable by processor 306 to effectuate the performance of functions by device 302.

Thus, realizations for P2P networks with protections may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media and/or executed by different processors.

Processor(s) 306 may be implemented using any applicable processing-capable technology. Media 308 may be any available media that is included as part of and/or accessible by device 302. It includes volatile and non-volatile media, removable and non-removable media, and storage media. For example, media 308 may include an array of disks for longer-term mass storage of processor-executable instructions 310, random access memory (RAM) for shorter-term storing of instructions that are currently being executed, and so forth.

As specifically illustrated, media 308 comprises at least processor-executable instructions 310. Generally, processor-executable instructions 310, when executed by processor 306, enable device 302 to perform the various functions described herein, including those actions that are illustrated in flow diagrams 400, 500, and 600 (of FIGS. 4, 5, and 6, respectively).

By way of example only, processor-executable instructions 310 may include P2P application 108, which includes individualization module (IM) 110 as well as signing and verifying module (SVM) 112. SVM 112 includes first and second secret peer keys ($k_1$ and $k_2$) and an ACS public key ($K_{ACS}$). These keys are described further herein below. As illustrated, SVM 112 is separated into a signing module (SM) 112S and a verifying module (VM) 112V.

Although shown as being part of P2P application 108, IM 110 and SVM 112 may be implemented separately from other components of P2P application 108. Also, their respective functionalities may be integrated into a single module. Likewise, the respective functionalities of SM 112S and VM 112V may also be integrated into a single module.

Figure 4:
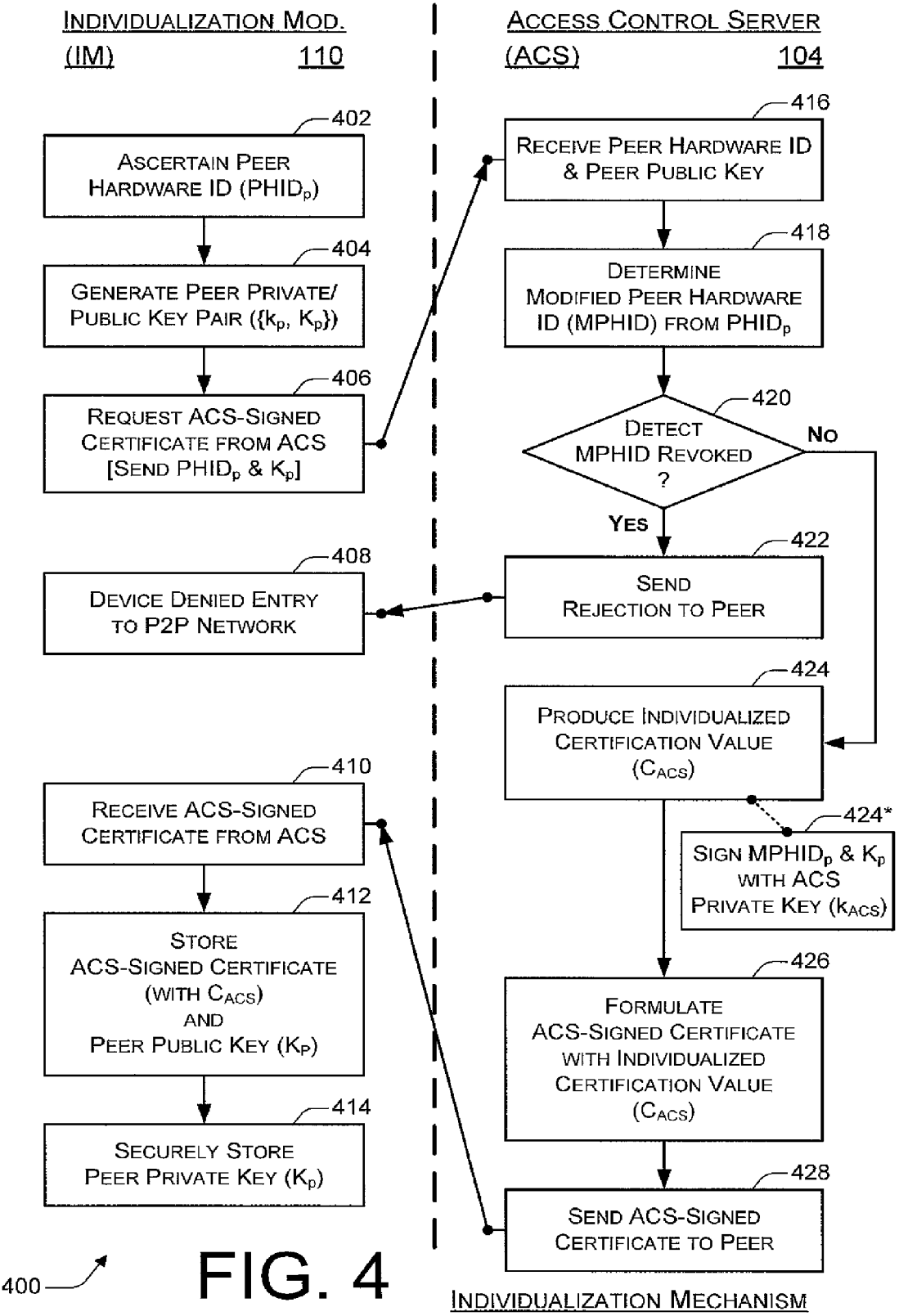
FIG. 4 is a flow diagram that illustrates an example of a method for individualizing a P2P application in a P2P network with protections.

Example Individualizing, Signing, and Verifying for P2P Networks with Protections FIG. 4 is a flow diagram 400 that illustrates an example of a method for individualizing a P2P application in a P2P network with protections. Flow diagram 400 includes fourteen (14) blocks 402-428. Although the actions of flow diagram 400 may be performed in other environments and with a variety of hardware and software combinations, an IM 110 (of FIG. 1) of a peer 102 in conjunction with an ACS 104 (or any authority generally) may be used to implement the method of flow diagram 400. More particularly, the actions of blocks 402-414 may be performed by an IM 110. The actions of blocks 416-428 may be performed by an ACS 104 or other general certificate authority.

When P2P application 108 is first installed to a peer 102, the peer's SVM 112 is individualized by the individualization mechanism of flow diagram 400. Flow diagram 400 may be divided into three major phases. Phase one includes blocks 402-406. Phase two includes blocks 416-428. Phase three includes blocks 410-414.

In the first individualization phase at block 402, IM 110 ascertains the peer hardware ID (PHID$_p$) of peer 102. The peer hardware ID (PHID$_p$) may be a combination of multiple unique IDs of the hardware components of the device 302. The combination may be a concatenation, a has value, a result of some other algorithm or algorithms, and so forth. Example hardware components include, but are not limited to, the hard drive(s), the network card, and so forth.

At block 404, IM 110 generates a peer private/public key pair ({k$_p$, K$_p$}). The peer private key k$_p$ and the corresponding peer public key K$_p$ are interrelated by: $D_{K_p}^a \{E_{k_p}^a \{x\}\} \equiv x, \forall x$, where $E_k^a\{\bullet\}$ and $D_k^a\{\bullet\}$ are respective asymmetric encryption and decryption operations with a key k. Symmetric encryption and decryption with a key k are denoted herein by $E_k^s\{\bullet\}$ and $D_k^s\{\bullet\}$, respectively. This pair of peer private and public keys {k$_p$, K$_p$} is used to sign the objects 106O uploaded by peer 102 and to verify authenticity and integrity of objects in P2P network 114.

At block 406, IM 110 sends a request to ACS 104 to acquire an ACS-signed certificate 202. The request is sent securely, and it includes the peer hardware ID (PHID$_p$) and the generated peer public key K$_p$.

In the second individualization phase at block 416, ACS 104 receives the peer hardware ID (PHID$_p$) and the peer public key (K$_p$) as sent by the peer's IM 110. Alternatively, the peer's public and private keys may be generated by the ACS. In this alternative implementation, the ACS sends the peer's private key to the peer. At block 418, ACS 104 determines a modified peer hardware ID (MPHID$_p$) from the peer hardware ID (PHID$_p$). For example, it may calculate a message authentication code (MAC) or a keyed hash of the peer hardware ID (PHID$_p$) to determine a globally-unique ID (GUID): GUID=$h_{k_h}$(PHID$_p$), with the ACS hash key k$_h$. The ACS hash key k$_h$ is known only to ACS.

At block 420, the determined modified peer hardware ID (MPHID$_p$) is compared to those in revoked certificates. If the peer's modified peer hardware ID (MPHID$_p$) is detected in the list of revoked certificates, a rejection of the request is sent to peer 102 at block 422. At block 408, as a consequence of the rejection, P2P application 108 denies access to P2P network 114 using peer 102.

Otherwise, if the modified peer hardware ID (MPHID$_p$) is not detected on the revocation list (at block 420), then at block 424 an individualized certification value (C$_{ACS}$) is produced. For example, as shown in block 424*, ACS 104 may sign modified peer hardware ID (MPHID$_p$) and peer public key (K$_p$) with an ACS private key (k$_{ACS}$). The signing may be effected in accordance with: $C_{ACS} = E_{k_{ACS}}^a \{MPHID_p // K_p // T // Others\}$, where "//" means concatenation, k$_{ACS}$ is the ACS's private key used to sign certificates issued by ACS 104 to peers 102, and T is the current time.

The "basic" form of the ACS-signed certificate 202 is used when the only action against an illicit peer is to remove the objects uploaded by the peer and to revoke the peer's access to P2P network 114. In this basic form, there is no other peer information included in the individualized certification value (C$_{ACS}$). In other words, the "Others" variable in C$_{ACS}$ is empty. If, on the other hand, the features of a P2P network 114 involve having a tracking mechanism that can fully identify an illicit user for possible legal actions, additional information is included in the "Others" variable.

To provide information for possible legal actions against an illicit user, personal information (e.g., the peer's IP address, the user's email address, the user's name or telephone number, some combination thereof, etc.) may be obtained from the user or peer, encrypted by a symmetric encryption with a key known only to ACS, and inserted into the "Others" variable. This "Others" variable is then signed together with MPHID$_p$ by ACS. Once a peer is convicted and the identity of the user is needed for legal actions, the personal information contained in the "Others" portion of the individualized certification value (C$_{ACS}$) is decrypted by ACS 104 and sent to law enforcement agencies to fully identify the perpetrator.

At block 426, an ACS-signed certificate with an individualized certification value (C$_{ACS}$) is formulated. For example, an ACS-signed certificate 202 that includes an individualized certification value (C$_{ACS}$) 204 may be formulated. At block 428, ACS 104 sends ACS-signed certificate 202 having the individualized certification value (C$_{ACS}$) to IM 110 of peer 102.

In the third individualization phase at block 410, IM 110 receives ACS-signed certificate 202 from ACS 104. At block 412, IM 110 stores ACS-signed certificate 202 having the individualized certification value (C$_{ACS}$) along with the peer public key (K$_p$) in local secure storage. At block 414, IM 110 also securely stores the peer private key (k$_p$). These values are used by the peer's SVM 112. IM 110 then sends an acknowledgment to ACS 104 to close the individualization session. The whole individualization mechanism may be completely transparent to an end user (except if a user is asked to provide some personal information (e.g., an email address) for the "Others" variable for some implementations of the described P2P network 114).

As illustrated in FIG. 3, SVM 112 includes two modules: SM 112S and VM 112V. SM 112S is used to sign objects 106O uploaded by peer 102. VM 112V is used to verify the authenticity and integrity of an object 106O before the object is uploaded to, downloaded from, or replicated in P2P network 114. Both modules share a pair of first and second secret peer keys k$_1$ and k$_2$. VM 112V also contains the ACS public key K$_{ACS}$ to verify the ACS-signed certificates 202 and revocation lists 116. Functions of SM 112S are described further herein below with particular reference to FIG. 5. Functions of VM 112V are described further herein below with particular reference to FIG. 6.

Figure 5:
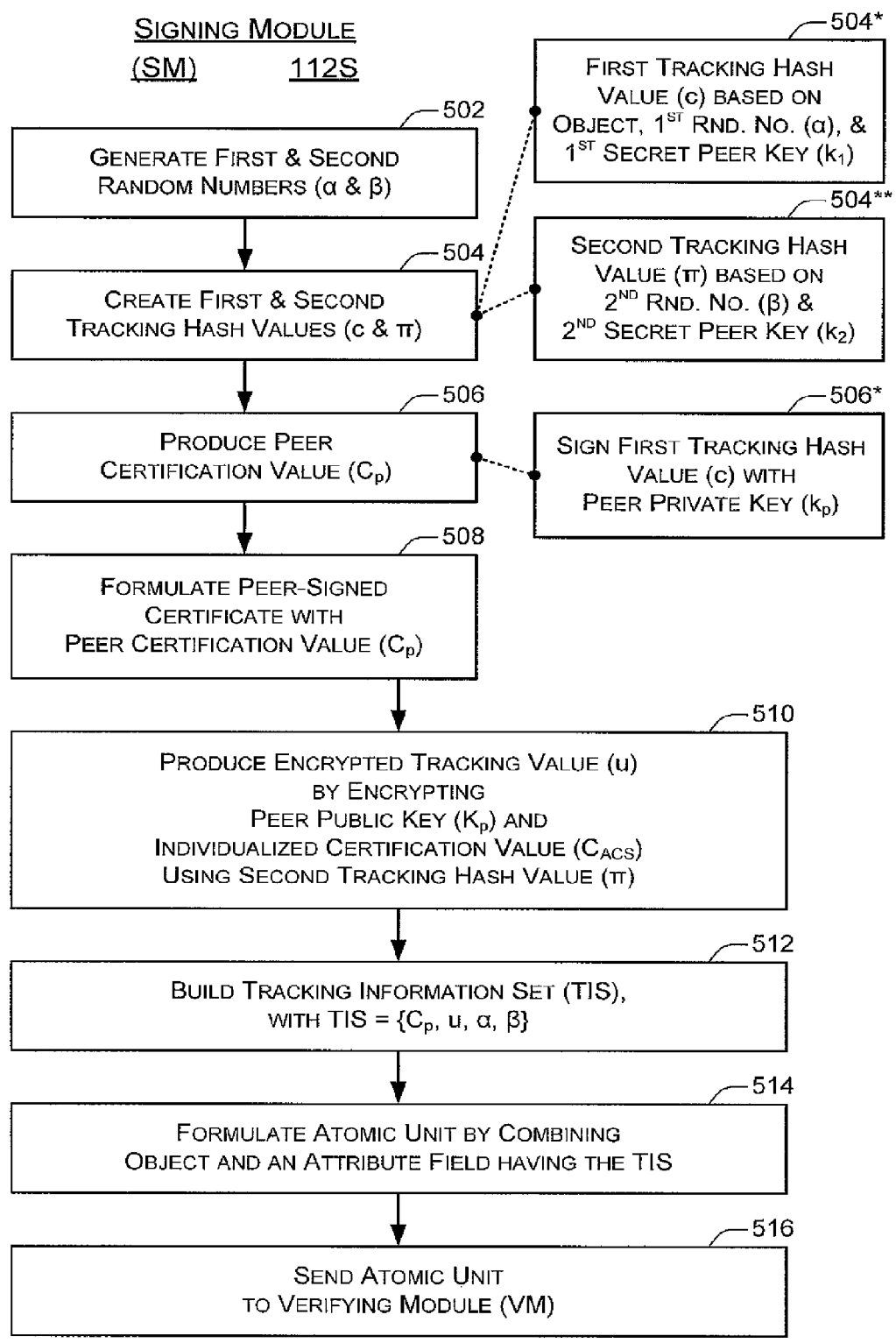
FIG. 5 is a flow diagram that illustrates an example of a method for signing an object in a P2P network with protections.

FIG. 5 is a flow diagram 500 that illustrates an example of a method for signing an object in a P2P network with protections. Flow diagram 500 includes eight (8) blocks 502-516. Although the actions of flow diagram 500 may be performed in other environments and with a variety of hardware and software combinations, an SM 112S (of FIG. 3) of a P2P application 108 of a peer 102 may be used to implement the method for uploading an object (Obj) 106O to P2P network 114.

At block 502, first and second random numbers (α and β) are generated. For example, a pseudorandom number generator (PNG) may be employed to generate two random numbers. At block 504, first and second tracking hash values (c and π) are created. As shown at block 504*, the first tracking hash value (c) is created based on the object (Obj), the first random number (α), and the first secret peer key (k$_1$). As shown at block 504**, the second tracking hash value (π) is created based on second random number (β) and the second secret peer key (k$_2$). For example, SM 112S inside SVM 112 may calculate the first and second tracking hash values using: $c = h_{k_1}(Obj // \alpha)$ and $\pi = h_{k_2}(\beta)$ where $h_k(\bullet)$ is a cryptographic keyed hash or MAC function using a key k.

At block 506, a peer certification value ($C_p$) is produced. As shown at block 506*, the peer certification value ($C_p$) may be produced by SM 112S signing the first tracking hash value (c) with the peer private key ($k_p$). For example, the first tracking hash value (c) may be signed to generate a peer signed certificate as follows: $C_p = E_{k_p}^a(c//T)$, where T is the current time. At block 508, a peer-signed certificate 208 with a peer certification value ($C_p$) 210 is formulated.

At block 510, an encrypted tracking value (u) is produced by encrypting the peer public key ($K_p$) and the individualized certification value ($C_{ACS}$) using the second tracking hash value ($\pi$). For example, SM 112S may encrypts its peer public key $K_P$ and its individualized root certificate $C_{ACS}$ with a symmetric cipher and the key $\pi$ as follows: $u = E_\pi^s \{K_p // C_{ACS}\}$.

At block 512, a tracking information set (TIS) is built. The TIS includes the peer certification value, the encrypted tracking value, the first random number, and the second random number ($\{C_p, u, \alpha, \beta\}$). At block 514, the TIS $\{C_p, u, \alpha, \beta\}$ is inserted into the object's tracking attribute field 106A, and attribute 106A is combined with object 106O to formulate an atomic unit 106. More generally, the atomic unit is formulated by combining the object and the peer-signed certificate. Atomic unit 106 is treated as an integrated monolithic whole when transferred into or out of P2P network 114 or from one peer 102 to another. At block 516, SM 112S sends atomic unit 106 to VM 112V.

Figure 6:
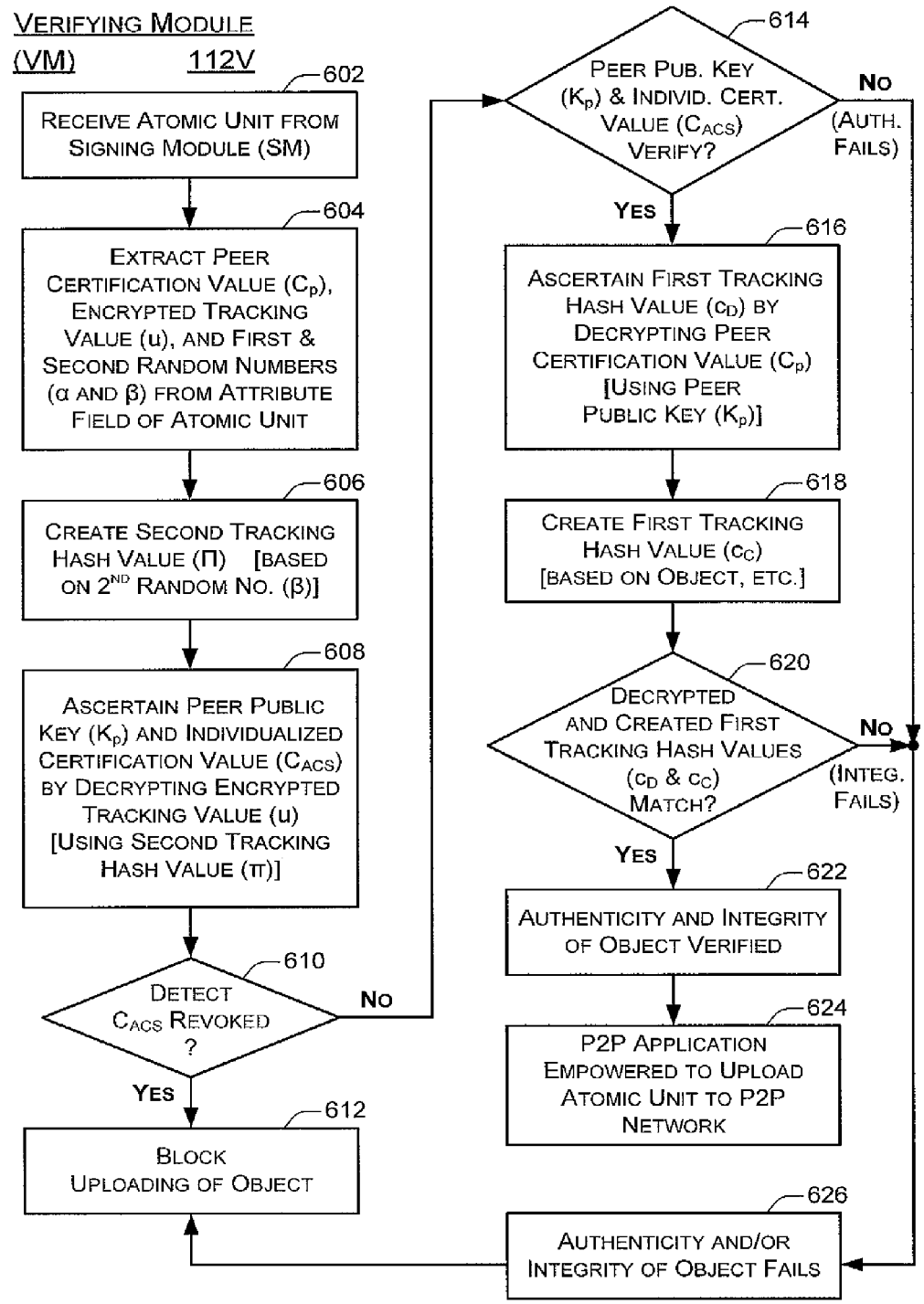
FIG. 6 is a flow diagram that illustrates an example of a method for verifying a signed object in a P2P network with protections.

FIG. 6 is a flow diagram 600 that illustrates an example of a method for verifying a signed object in a P2P network with protections. Flow diagram 600 includes thirteen (13) blocks 602-626. Although the actions of flow diagram 600 may be performed in other environments and with a variety of hardware and software combinations, a VM 112V (of FIG. 3) of a P2P application 108 of a peer 102 may be used to implement the method for verifying authenticity and integrity of an object (Obj) 106O for P2P network 114.

At block 602, an atomic unit 106 is received at VM 112V from SM 112S. At block 604, the peer certification value ($C_p$), the encrypted tracking value (u), the first random number ($\alpha$), and the second random number ($\beta$) of the TIS $\{C_p, u, \alpha, \beta\}$ are extracted from the attributes field 106A of atomic unit 106.

At block 606, the second tracking hash value ($\pi$) is created based on the second random number ($\beta$) and the second secret peer key ($k_2$) [e.g., in accordance with $\pi = h_{k_2}(\beta)$]. At block 608, the peer public key ($K_p$) and the individualized certification value ($C_{ACS}$) are ascertained by decrypted the encrypted tracking value (u). The just created second tracking hash value ($\pi$) is used to decrypt the encrypted tracking value (u). Thus, the peer public key ($K_p$) and the individualized certification value ($C_{ACS}$) may be extracted in accordance with $K_P // C_{ACS} = D_\pi^s \{u\}$.

At block 610, it is detected if the individualized certification value ($C_{ACS}$) has been revoked with reference to revocation list 116. If the individualized certification value ($C_{ACS}$) is present on revocation list 116, then at block 612 the uploading of the object is blocked.

If the individualized certification value ($C_{ACS}$) is not detected on revocation list 116 (at block 610), then at block 614 it is determined if the decrypted peer public key ($K_p$) and the decrypted individualized certification value ($C_{ACS}$), both of the of the original uploader, properly verify. The ACS public key ($K_{ACS}$) is used to verify them. If the authenticity verification fails, then the method of flow diagram 600 continues at block 626, which is described herein below.

If, on the other hand, they are verified (at block 614), then at block 616 the first tracking hash value ($c_D$) is ascertained by decrypting the peer certification value ($C_p$) [using the peer public key ($K_p$)]. For example, the decryption may be accomplished in accordance with c: $c//T = D_{K_p}^a \{C_p\}$. At block 618, the first tracking hash value ($c_C$) is created. It may be created based on, for example, the object (Obj), the first random number ($\alpha$), and the first secret peer key ($k_1$) [e.g., in accordance with $h_{k_1}(Obj//\alpha)$].

At block 620, the decrypted first tracking hash value ($c_D$) is compared to the created first tracking hash value ($c_C$) to determine if they match. If they fail to match, then the integrity verification fails and the method of flow diagram 600 continues at block 626, which is described herein below. If, on the other hand, the two versions of the first tracking hash value (c) do match (as determined at block 620), then the integrity verification is successful. At block 622, both the authenticity and the integrity of the object 106O are therefore verified. At bock 624, P2P application 108 is thus empowered to upload/receive atomic unit 106 to/from P2P network 114.

If the authenticity (as determined at block 614) or the integrity (as determined at block 620) fail, then at block 626 the verification of object 106O fails. At block 612, the verifying mechanism returns failure and uploading and/or transfer of object 106O is rejected and blocked. The uploading process, if successful, can be accomplished without peer 102 contacting any server. Moreover, the process can be completely transparent to an end user.

Other Example Operations in P2P Networks with Protections

When a peer is going to download or replicate an object from another peer, the peer's VM first verifies the authenticity and integrity of the object. This verification is the same as the verification performed by VM when a peer uploads an object, which is described herein above with particular reference to FIG. 6. If the verification is successful, VM returns OK, and the requested downloading or replication is executed. Otherwise, VM returns failure, and the request is rejected. In the latter case, the peer that stores the object that fails the verification is contacted, and the peer performs its own verification of authenticity and integrity for the allegedly failing object. If the failure allegation is confirmed, the object is removed by the storing peer.

In a described implementation, a peer also periodically verifies the authenticity and integrity of the objects that it stores for the P2P network. Any object that fails in this verifying is removed from the peer's local storage. This verification may occur when, for example, the local revocation list is updated and new revoked certificates are present on the new revocation list. This procedure ensures that, over time, the objects uploaded by revoked peers are removed from the P2P network.

Depending on the policy or policies established for a given P2P network, a peer in the revocation list may be denied access to the P2P network, which is a severer punishment than merely revoking its right to upload objects to the P2P network. This access denial may be implemented, for example, by requiring VM to check the revocation list and to compare entries on the list with the local peer's public key. If the local peer's public key is present in the list, a user's request to access the P2P network is rejected. In this case, the user is unable to access any of the services of the P2P network.

It is also possible that a peer may regain access to the P2P network and/or to the ability to upload objects to the P2P network when certain conditions are met. Granting a peer renewed rights can be realized by removing the peer from the revocation list. When VM rejects a peer's request to upload or access the P2P network due to the peer being on the revocation list, it can, prior to returning failure, update its revocation list to check if the peer's rights have been recovered as evidenced by the latest revocation list.

In a described implementation, production of the individualized certification value ($C_{ACS}$) may optionally be altered to prevent users from being able to circumvent the copyright protections merely be changing a single hardware component. ACS 104 can replace the modified peer hardware ID ($MPHID_p$) with an encrypted version of the peer hardware ID ($PHID_p$) that includes single hardware IDs for each of multiple components. If any of the single hardware IDs is present on a revocation list, then the individualization request is rejected and the individualization process fails. This forces a user to replace each and every hardware component of a device 302 in order to circumvent the copyright protections described herein.

The devices, actions, aspects, features, functions, procedures, modules, data structures, protocols, models, components, etc. of FIGS. 1-6 are illustrated in diagrams that are divided into multiple blocks. However, the order, interconnections, interrelationships, layout, etc. in which FIGS. 1-6 are described and/or shown are not intended to be construed as a limitation, and any number of the blocks can be modified, combined, rearranged, augmented, omitted, etc. in any manner to implement one or more systems, methods, devices, procedures, media, apparatuses, APIs, arrangements, etc. for P2P networks with protections.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A device, comprising:
   at least one processor; and
   one or more storage media including processor-executable instructions that are capable of being executed by the at least one processor, wherein the processor-executable instructions, when executed, direct the device to perform actions comprising:
   generating a first random number;
   creating a first tracking hash value based on an object and the first random number;
   producing a peer certification value responsive to the first tracking hash value;
   formulating a peer-signed certificate using the peer certification value;
   detecting if an ascertained individualized certificate has been revoked with reference to a revocation list that is made available at a central server and is distributed to a plurality of peers, the revocation list containing a list of revoked certificates;
   updating a revocation list stored locally on a peer if a threshold of a maximum non-updating period is reached, the threshold of a maximum non-updating period corresponding to a predetermined period of time in which the revocation list is to be updated;
   building a tracking information set that includes the peer-signed certificate, the peer certification value, an encrypted tracking value, the first random number, and a second random number;
   formulating an atomic unit by combining the object with the tracking information set by inserting the tracking information set into a tracking attribute field of the object;
   attempting to upload the atomic unit to a peer-to-peer network;
   when the atomic unit is uploaded to the peer-to-peer network, joining the atomic unit to persistent metadata that contains an uploader-signed certificate that is used to track an uploader of the atomic unit;
   authenticating and validating the uploader-signed certificate when the atomic unit is first uploaded to the peer-to-peer network and when the atomic unit is replicated from a first peer to a second peer;
   entitling the uploader of the atomic unit to upload additional atomic units to the peer-to-peer network and to remain anonymous until illicit material uploaded by the uploader is discovered; and
   upon discovery of the illicit material, identifying the uploader and removing the illicit material from the peer-to-peer network.

2. The device as recited in claim 1, wherein the peer-signed certificate includes a certificate signed by an authority to validate the peer-signed certificate.

3. The device as recited in claim 1, wherein:
   the action of creating a first tracking hash value comprises an action of creating the first tracking hash value using a first secret peer key.

4. The device as recited in claim 1, wherein the processor-executable instructions, when executed, direct the device to perform further actions comprising:
   generating the second random number; and
   creating a second tracking hash value based on the second random number;
   wherein the action of formulating an atomic unit comprises an action of formulating the atomic unit by combining the object with the second random number.

5. The device as recited in claim 4, wherein:
   the action of creating the second tracking hash value comprises an action of creating the second tracking hash value based on a second secret peer key.

6. The device as recited in claim 1, wherein the processor-executable instructions, when executed, direct the device to perform further actions comprising:
   creating a second tracking hash value based on the second random number; and
   producing, using the second tracking hash value, an encrypted tracking value responsive to a peer public key and an individualized certification received from an authority and based on at least one hardware component of the device;
   wherein the action of formulating an atomic unit comprises an action of formulating the atomic unit by combining the object with the encrypted tracking value.

7. The device as recited in claim 1, wherein:
   the processor-executable instructions, when executed, direct the device to perform further actions comprising:
   creating a second tracking hash value based on the second random number; and
   producing, using the second tracking hash value, the encrypted tracking value responsive to a peer public key and the individualized certificate received from an authority and based on at least one hardware component of the device.

8. The device as recited in claim 7, wherein the processor-executable instructions, when executed, direct the device to perform further actions comprising:

creating another second tracking hash value based on the second random number as extracted from the tracking information set of the atomic unit;
ascertaining the individualized certification value and the peer public key by decrypting the encrypted tracking value, as extracted from the tracking information set of the atomic unit, using the other second tracking hash value;
if the ascertained individualized certificate is detected to have been revoked, blocking uploading of the atomic unit;
verifying if the ascertained individualized certification value and the ascertained peer public key are authentic using a public key of the authority; and
blocking uploading, downloading, or replication of the atomic unit if verification fails.

9. The device as recited in claim 7, wherein the processor-executable instructions, when executed, direct the device to perform further actions comprising:
ascertaining the first tracking hash value by decrypting the peer certification value, as extracted from the tracking information set of the atomic unit, using the peer public key;
creating another first tracking hash value based on the object and the first random number, as extracted from the tracking information set of the atomic unit;
verifying if the object has integrity by comparing the ascertained first tracking hash value to the created other first tracking hash value; and
if the object is verified to have integrity, permitting the atomic unit to be uploaded to the peer-to-peer network.

10. A method, comprising:
receiving a peer hardware identifier from a peer at an authority, the peer hardware identifier based on at least one hardware component of the peer;
determining a modified peer hardware identifier from the peer hardware identifier;
producing an individualized certification value responsive to the modified peer hardware identifier;
formulating an authority-signed certificate using the individualized certification value, the authority-signed certificate being used by the peer to access a peer-to-peer network;
maintaining a revocation list at the authority, the revocation list including multiple respective modified peer hardware identifiers corresponding to multiple respective devices that are to be denied access to a peer-to-peer network;
distributing the revocation list to a number of devices that are permitted access to the peer-to-peer network;
requiring each device receiving the revocation list to update a locally stored revocation list when a threshold of a maximum non-updating period is reached, the threshold of a maximum non-updating period corresponding to a predetermined period of time in which the locally stored revocation list is to be updated;
in response to the peer uploading an atomic unit to the peer-to-peer network, joining the atomic unit to persistent metadata and associating a peer-signed certificate with the atomic unit that is used to track the peer, the atomic unit being created by combining an object with a tracking information set that includes the individualized certification value, the authority-signed certificate, an encrypted tracking value, a first random number, and a second random number, the tracking information set being inserted into a tracking attribute field of the object;
authenticating and validating the peer-signed certificate when the atomic unit is first uploaded to the peer-to-peer network and when the atomic unit is replicated from a first peer to a second peer;
entitling the peer to upload additional atomic units to the peer-to-peer network and to remain anonymous until either the atomic unit or the additional atomic units are determined to be illicit; and
upon discovery of illicit content, identifying the peer utilizing the peer-signed certificate and removing uploaded content associated with the peer from the peer-to-peer network.

11. The method as recited in claim 10, wherein:
the receiving comprises receiving a peer public key from the peer at the authority; and
the producing comprises producing the individualized certification value responsive to the peer public key.

12. The method as recited in claim 10, wherein:
the receiving comprises receiving at the authority identifying personal information associated with a user of the peer; and
the producing comprises producing the individualized certification value responsive to the identifying personal information associated with the user.

13. The method as recited in claim 10, further comprising:
checking if the modified peer hardware identifier is on the revocation list; and
sending a rejection notification to the peer denying the peer the authority-signed certificate when the modified peer hardware identifier is on the revocation list.

14. One or more processor-accessible storage device comprising processor-executable instructions that include;
a peer-to-peer application that uses a first certificate signed by an authority to evidence uploading rights for a peer-to-peer network and a second certificate signed by a peer on which the peer-to-peer application is to execute, the first certificate including an individualized certification value that is based, at least in part, on an identifier of at least one hardware component of the peer; and
a signing and verifying module that verifies an authenticity and integrity of an object when the peer either downloads or replicates an object from another peer, the signing and verifying module further to:
create an atomic unit to be uploaded to the peer-to-peer network, the atomic unit being created by combining the object with a tracking information set that includes the first certificate, the second certificate, a peer certification value, an encrypted tracking value, a first random number, and a second random number;
return a failure and reject the download or replication of the atomic unit when the verification is unsuccessful;
instructing the peer to perform an independent verification of authenticity and integrity for the atomic unit and remove the atomic unit from storage when the verification is unsuccessful;
joining the atomic unit to persistent metadata that contains an uploader-signed certificate when the atomic unit is uploaded by the another peer to the peer-to-peer network, the uploader-signed certificate being used to track the another peer;
entitling the another peer to upload one or more additional atomic units to the peer-to-peer network and to remain anonymous until the atomic unit or the one or more additional atomic units uploaded by the another peer are determined to be illicit; and
upon discovering an illicit object, identifying the another peer utilizing the uploader-signed certificate and removing objects uploaded by the another peer from the peer-to-peer network; and a revocation list that contains a list of revoked certificates and that is maintained at a central server and is distributed to each peer, each peer being required to update its locally stored revocation list when a threshold of a maximum non-updating period is reached, the threshold of a maximum non-updating period corresponding to a predetermined period of time in which the locally stored revocation list is to be updated.

15. The one or more processor-accessible storage device as recited in claim 14, wherein the second certificate evidences authenticity and integrity for a particular object that is to be uploaded to the peer-to-peer network; and wherein the second certificate includes a peer certification value that is produced responsive to the object.

16. The one or more processor-accessible storage device as recited in claim 14, wherein the peer-to-peer application comprises an individualization module that interacts with the authority to receive the first certificate by sending a peer hardware identifier and a peer public key to a access control server when the peer-to-peer application is initially installed on the peer.

* * * * *

UNITED STATES PATENT AND TRADEMARK OFFICE
CERTIFICATE OF CORRECTION

PATENT NO.        : 7,987,368 B2                                    Page 1 of 1
APPLICATION NO.   : 11/381951
DATED             : July 26, 2011
INVENTOR(S)       : Bin Zhu et al.

It is certified that error appears in the above-identified patent and that said Letters Patent is hereby corrected as shown below:

In Title page, in field (57), under "Abstract" column 2, line 6, before "uploader" insert -- an --.

Signed and Sealed this
Thirtieth Day of August, 2011

David J. Kappos
*Director of the United States Patent and Trademark Office*